April 21, 1936.    R. P. SHERMAN    2,038,388
MOUNTING FOR DRILL CUTTERS
Filed Aug. 3, 1935
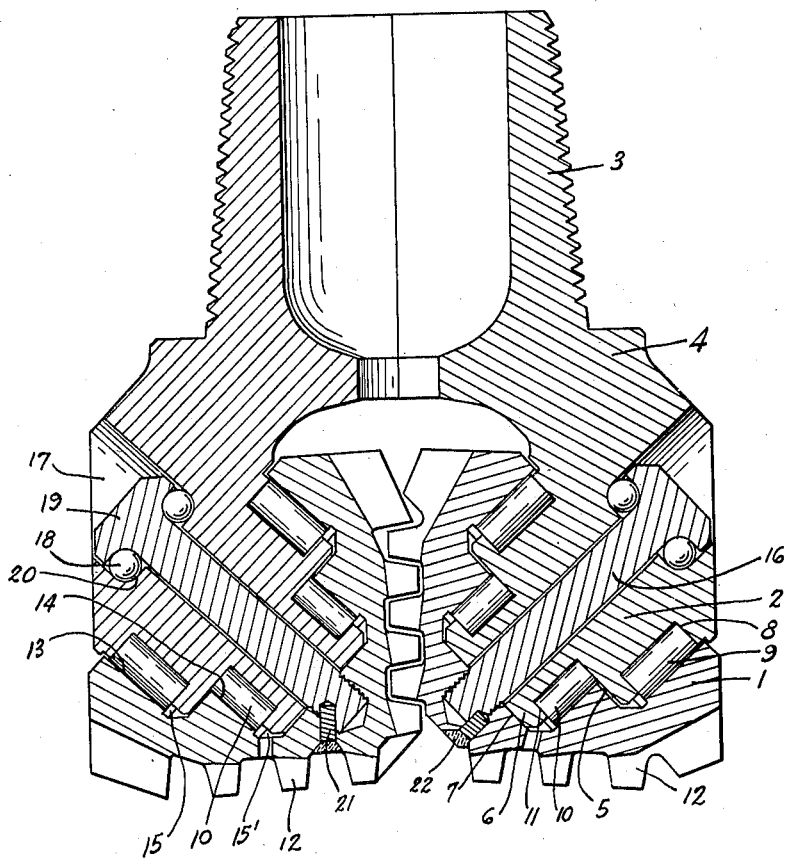
Ralph P. Sherman
INVENTOR
BY Jesse R. Stone
ATTORNEY Patented Apr. 21, 1936

2,038,388

UNITED STATES PATENT OFFICE 2,038,388

MOUNTING FOR DRILL CUTTERS

Ralph P. Sherman, Houston, Tex., assignor to Hughes Tool Company, Houston, Tex., a corporation of Texas Application August 3, 1935, Serial No. 34,484

5 Claims. (Cl. 255—71)

My invention relates to the mounting of drill cutters such as are employed upon the so-called hard formation "cone bits". Such bits have cutters of a general conical shape mounted upon and enclosing the end of a cutter shaft projecting inwardly and downwardly from the head.

In cutters such as this, it has become customary to employ antifriction bearings, and a row of balls is used to fit in a raceway partly within the cutter and partly in the shaft and thus retain the cutter upon the shaft.

As the thrust of the cutter in operation is exerted strongly upon the retaining balls in such a construction, there is difficulty in preventing the breaking and wear upon the balls.

It is an object of the invention to employ roller bearings exclusively upon the cutter support and to arrange to take the thrust away from the ends of said rollers.

I desire to retain the cutter upon its shaft by the use of an axial retaining pin, rotatable with the cutter and having antifriction bearings thereon away from the cutter bearings.

It is an object to retain the cutter upon the shaft without the use of the usual row of retaining balls now commonly employed.

In the drawing is shown a central longitudinal section through a two-cutter drill embodying the invention.

The two rotatable conical cutters 1 are supported upon shafts 2 projecting downwardly at an angle relative to the head 4. Said head has an upwardly extending shank 3 threaded to engage with the drill collar or similar coupling by means of which it is secured to the drill stem—not shown.

The shafts 2 are extended inwardly toward each other and are larger adjacent the head. The diameter of each shaft is stepped down at 5 to form a shoulder. The smaller forward end has its end surface 7 flattened to form an end thrust bearing for the cutter. The larger bearing area is recessed at 8 to receive a row of roller bearings 9. A similar row of bearings 10 is included in an annular recess 11 in the smaller end portion of the shaft.

The cutters 1 are formed on their outer surfaces with rows of teeth 12, the rows of teeth on one cutter being offset from corresponding rows of teeth on the other cutter. These teeth are shown as interfitting on adjacent cutters as seen in the drawing. The interior of each cutter is formed to fit the shaft. There is an outer cylindrical area 13 to engage the row of rollers 9 and an inner area 14 to bear upon the rollers 10. At the inner end of each bearing area, the inner wall of the cutter is recessed at 15 and 15' so that there will be no rolling contact upon the ends of the roller bearings. This will avoid any end thrust upon the rollers and will also tend to allow the rollers to roll evenly at both ends and not get out of longitudinal alignment in their raceways.

The cutters are retained upon their bearings by means of retaining pins 16 which extend through the head and axially through each shaft and have the inner ends of the pins threaded into a recess on the inner wall of the cutter at the smaller end thereof. The outer end of the retaining pin has a head 19 which fits rotatably within a recess 17 in the head of the drill. The inner side of the pin head is formed into an annular raceway to bear against the balls 18, which separate the head 19 from the inner end 20 of the recess 17.

The retaining pin rotates with the cutter. Its inner end may be fixed against unscrewing from the cutter by a screw or dowel 21 extended inwardly in the wall of the cutter and engaged within a recess in the pin 16. The end of the opening in the cutter through which the locking screw is engaged may be filled with a bond of welding metal 22.

In the use of these cutters the two rows of rollers are so positioned as to take the principal bearing thrust and give to the cutter an even bearing wear in use. There is little wear upon the retaining pin 16 as it is smaller in diameter than the axial bore in the head and shaft into which it extends. The bearings 18 at the head of the retaining pin have little to support as there is little thrust inwardly along this pin. The outward component of the bearing thrust is taken up largely along the end area 7 of the shaft.

It will thus be seen that the bearings are well balanced so that the parts will wear uniformly and the breaking or premature impairment of the bearings will be avoided. I thus obtain a smoothly operating cutter having a maximum of endurance. By eliminating the balls from the bearing shaft, they are not easily broken in use and the common difficulty of broken balls is avoided.

What I claim as new is:

1. In a well drill, a drill head, downwardly and inwardly extending cutter shafts thereon, approximately conical shaped cutters enclosing about the inner ends of said shafts, roller bearings on said shafts for said cutters, retaining pins extending through said head and axially through each cutter shaft and secured rigidly in the cutter to rotate therewith, and a head on each pin to hold the cutter in position on said shaft.

2. In a well drill, a drill head, downwardly and inwardly extending cutter shafts thereon, approximately conical shaped cutters enclosing about the inner ends of said shafts, roller bearings on said shafts for said cutters, retaining pins extending through said head and axially through each cutter shaft and secured rigidly in the cutter to rotate therewith, a head on each of said pins and antifriction bearings between said head and the wall of said bit head.

3. A well drill including a head, a cutter shaft thereon, a cutter surrounding the inner end of said shaft, bearings for said cutter on said shaft, a retaining pin extending through said head and shaft axially of said shaft, means to engage said pin rigidly to said cutter, a head on said pin and antifriction means between said pin head and said drill head to retain said cutter rotatably on said shaft.

4. A well drill including a head, a cutter shaft thereon, a cutter surrounding the inner end of said shaft, bearings for said cutter on said shaft, a retaining pin extending through said head and shaft axially of said shaft, a threaded engagement of said pin to the inner wall of said cutter, means to fix said pin from unscrewing, an enlarged head on the outer end of said pin, and a ball bearing on the inner side of the head of said pin.

5. A roller well drill including a head, downwardly and inwardly inclined shafts on said head, said shafts having a larger diameter roller raceway at its outer end and a smaller diameter roller raceway adjacent its inner end, rows of rollers in said raceways, cutters enclosing the ends of said shafts and engaging said rollers, and the forward ends of said shafts, a retaining pin for each cutter, said pin extending inwardly axially of the shaft and fixedly engaging the cutter to rotate therewith and antifriction means at the outer end of said pin to hold said cutter rotatably on said shaft.

RALPH P. SHERMAN.